United States Patent [19]

Matzek

[11] 3,852,043
[45] Dec. 3, 1974

[54] STABILIZATION OF ALUMINUM HYDRIDE
[75] Inventor: Norman E. Matzek, Midland, Mich.
[73] Assignee: The Dow Chemical Company, Midland, Mich.
[22] Filed: Dec. 15, 1966
[21] Appl. No.: 602,455

[52] U.S. Cl.................. 23/293, 149/109, 423/645
[51] Int. Cl............................................. B01j 1/00
[58] Field of Search ............... 149/87; 23/204, 293; 62/60, 62; 34/22, 36; 423/645

[56] References Cited
UNITED STATES PATENTS
2,920,935  1/1960  Finholt........................... 149/87 UX
2,960,394  11/1960  Schrieber et al.................. 149/87 X
3,153,902  10/1964  Morrell............................ 149/87 X Primary Examiner—Leland A. Sebastian
Attorney, Agent, or Firm—C. Kenneth Bjork

[57] ABSTRACT

The invention is a process for upgrading the thermal stability of light metal hydrides, particularly substantially non-solvated, crystalline aluminum hydride by maintaining the hydride under a substantially inert atmosphere at a maximum temperature of about 0° C., preferably from about minus 15° C. to about −200° C., for an extended period of time. Said aluminum hydride is useful as a fuel component in solid rocket propulsion systems or in gas generators.

5 Claims, No Drawings

STABILIZATION OF ALUMINUM HYDRIDE

BACKGROUND OF THE INVENTION

This invention is concerned with the stabilization of light metal hydrides and more particularly is concerned with a novel process for improving the thermostability of substantially non-solvated crystalline aluminum hydride.

Light metal hydrides e.g., substantially non-solvated, crystalline aluminum hydride, find utility as fuel components in solid rocket propulsion systems, as gas generators and in other similar operations. In particular, a substantially non-solvated, ether insoluble, crystalline aluminum hydride (hereinafter referred to as alpha-aluminum hydride) having a hexagonal crystal structure, a specific well-defined X-ray diffraction pattern and a density of over 1.4 grams per cubic centimeter has been found to be an especially desirable fuel for solid rocket propulsion systems. However, at temperatures above about 60° C. this material both during storage and when used in a propellant grain tends to undergo detrimental spontaneous decomposition with time liberating gaseous hydrogen. Additionally, it has been found that to a certain degree undesirable decomposition may occur with long term storage at ambient temperature, i.e., from about 18° to about 25° C., for example.

Some increase in the thermostability of this and other non-solvated aluminum hydride materials has been realized by coating the surface of three compounds with either an inert coating or with materials which react with aluminum hydride to give a relatively inert surface layer.

It also has been found that by incorporating magnesium values in an amount of at least about 0.01, and usually from about 0.1 to about 3 or more weight percent, based on the light metal hydride, into the crystal lattice of the light metal hydride the thermostability of the resulting light metal composition is markedly increased over that shown by the non-magnesium containing product. This improved stability particularly is shown with substantially non-solvated, crystalline aluminum hydride having from about 0.4 to about 2 weight percent magnesium incorporated into the lattice.

Ordinarily, preparation of this latter product is practiced by adding a finely divided magnesium source material, usually a substantially anhydrous magnesium salt, magnesium organometallic or a binary magnesium hydride or complex magnesium hydride, directly to a reaction mixture during the preparation of the light metal hydride. This assures that the magnesium is quite uniformly dispersed throughout the lattice in the resulting stabilized product.

In a preferred embodiment of preparing a substantially non-solvated, crystalline aluminum hydride having magnesium in the crystal lattice, a magnesium halide, e.g., magnesium chloride, and a liquid aromatic hydrocarbon, e.g., benzene, which is miscible with ether are introduced into and mixed with agitation in a reaction mixture of aluminum chloride and alkali metal aluminum hydride, e.g. $LiAlH_4$ or $NaAlH_4$ in ether, e.g., diethyl ether used to prepare aluminum hydride. Ordinarily, the lithium aluminum hydride-aluminum chloride reactants range in a gram mole ratio of 3 to 4 ($LiAlH_4/AlCl_3$) based on that required stoichiometrically for aluminum hydride formation. Following the reaction period, ether is removed from the product mixture by heating at a temperature of from about 40° to about 140° C., ordinarily in the presence of a complex borohydride such as lithium borohydride, sodium borohydride or excess of the alkali metal aluminum hydride, thereby to provide a crystalline, substantially non-solvated aluminum hydride containing a predetermined amount of magnesium. Generally, the amount of complex hydride used is such that there is from about 1/4 to about 1 mole of the complex hydride present for each mole of aluminum hydride product.

Usually, finely divided, substantially anhydrous magnesium source material, is added to an agitated reaction mixture. The resultant mix is stirred or otherwise agitated for a period of at least about 3 minutes, ordinarily from about 5 minutes to about 1.5 hours or more and usually from about 10 minutes to about 1 hour.

The temperatures employed are not critical, the process being operable at temperatures normally employed in light metal hydride preparation.

By eliminating the magnesium value containing reactant from the reaction mixture, this latter method produces alpha-aluminum hydride.

SUMMARY

Now, unexpectedly, it has been found that the thermostability of non-solvated, crystalline aluminum hydrides and such aluminum hydrides having magnesium values incorporated into the crystal lattice can be still further markedly improved over that realized heretofore if the resulting crystalline aluminum hydride product material is maintained at a maximum temperature of about 0° C. for a period of at least about 4 months prior to use.

Preferably, in accordance with the present invention a crystalline, substantially non-solvated aluminum hydride material is stored at a maximum temperature of about minus 5° C., and ordinarily at least at about minus 15° C., usually at from about minus 15° C. to about minus 200° C. under a substantially inert atmosphere for a period of at least about 6 months or more prior to use. In general, within the disclosed temperature range, as the storage time increases, the thermal stability also increases.

For optimum in thermal stability, the aluminum hydride should be placed in the requisite low temperature atmosphere promptly after manufacture as materials which have been stored a ambient temperature for a period of time usually undergo some deterioration and autodecomposition and upon subjection to elevated temperature many times exhibit a decreased thermal stability.

Atmospheres particularly suitable for use in the practice of the present invention are nitrogen, argon, hydrogen, helium and the like which do not react with or attack the crystalline, substantially non-solvated aluminum hydride product. Generally, the atmosphere used is substantially anhydrous; however, no detrimental effect on subsequent thermostability of the aluminum hydride produce is found on samples subjected to low temperature wherein the atmosphere contains water or water vapor such that up to about 2 percent hydrolysis of the aluminum hydride occurs.

In actual practice of the invention, the aluminum hydride can be placed into a suitable container, an atmosphere of the inert gas be provided and the container sealed to render it leak proof to the atmosphere and the resulting unit placed in a cold storage area maintained at the operating temperature. Alternatively, the aluminum hydride can be placed in a storage vessel equipped with a refrigerating system and a means for maintaining a low temperature atmosphere in contact with the product.

Other means for storing and maintaining the aluminum hydride at the required temperature for the requisite minimum period of time can be used as is understood by one skilled in the art.

The following Examples will serve to further illustrate the present invention but are not meant to limit it thereto.

EXAMPLE 1

A solution of aluminum hydride was prepared by mixing at room temperature volumes of about a 1 molar diethyl ether solution of aluminum chloride ($AlCl_3$) and about a 1 molar diethyl ether solution of lithium aluminum hydride ($LiAlH_4$) to provide a $LiAlH_4/AlCl_3$ ratio in the resulting reaction mixture, on a gram mole basis, of about 4. The mixture was filtered through a medium glass frit to remove precipitated lithium chloride therefrom into about a 1 molar diethyl ether solution of lithium borohydride. Ground magnesium chloride, calculated to provide about 2 weight percent magnesium in the final aluminum hydride product, and benzene in an amount to produce a solution containing about 30 volume percent ether was added to the reaction mixture.

The resulting mixture was stirred for about 20 minutes, filtered into a reaction flask and the reaction flask connected to a distillation column. The reaction flask with the product solution was immersed in an oil bath maintained at approximately 105° C. and the ether removed by distillation over about a 2.5 hour period. After this period, the reaction vessel which now held a white crystalline product was removed from the distillation column and the product washed with diethyl ether. The solid product was dried at ambient temperature, i.e.,-18°-20° C., under a reduced pressure of about $1 \times 10^{-3}$ millimeter mercury absolute.

All manipulative and operating procedures were carried out in the presence of a substantially anhydrous nitrogen atmosphere and all reactants, solvents and liquid carriers were substantially moisture free.

Elemental analysis of the resulting white, crystalline product showed on a weight basis C < 0.1 percent, H 9.8 percent, Al 86.6 percent, Cl 0.5 percent, Li 0.4 percent and Mg 2.1 percent.

Unit cell dimensions as calculated from an X-ray powder diffraction pattern of the hexagonal crystal structure product taken with an AEG Guinier type focusing camera were found to be $a=4.453_4$A, $C=5.916_5$A. The unit cell dimensions calculated for an alpha-aluminum hydride product prepared by the same procedure as described directly hereinbefore, except that no magnesium values were added to the reaction mixture, were $a=4.450_2$A, $C=5.906_6$A. The increase in lattice constants for the magnesium containing product indicates the magnesium values are incorporated into the crystal lattice structure of the aluminum hydride giving an expanded unit cell.

Two portions of the product were taken and sealed in a container under a nitrogen atmosphere and stored at a temperature of about minus 15° C. for about 5 months. After this period, one sample of the so-stored material was tested at 60° C. in a nitrogen atmosphere using a standard Taliani test apparatus. This sample required 75days to undergo 1 percent decomposition under the standard test conditions. Similar testing of the second sample stored about 1.5 years at minus 15° C. showed about 93 days to reach 1 percent decomposition.

As a control, a sample of this same product was similarly tested in the Taliani after preparation and prior to low temperature storage. This sample was found to reach 1 percent decomposition in 13 days.

EXAMPLE 2

A number of magnesium containing substantially non-solvated crystalline aluminum hydride produces were prepared following the same general procedure set forth in Example 1. These materials were stored for various periods of time at about minus 15° C. under a nitrogen atmosphere. Following this period the thermal stability of the products were evaluated using the standard Taliani test apparatus and technique.

The results of this study are summarized in Table I which follows.

Table I

| Run No. | % Mg in $AlH_3$ | Storage Time months | Taliani Test Results (Days to reach 1% decomposition) | |
|---|---|---|---|---|
| | | | Original | After Storage |
| 1 | 1.0 | 9–12 | 14.0 | 82 |
| 1a | 1.53 | 4–6 | 6.8 | 26 |
| 1b | do. | 9–12 | 6.8 | 46 |
| 2a | 1.64 | 6 | 13.5 | 22.5 |
| 2b | do. | 10 | do. | 27.0 |
| 3a | 1.72 | 4 | 12.9 | 42 |
| 3b | do. | 10 | do. | (0.5% dec. in 46 days) |
| 4 | 1.96 | 7 | 16.8 | 29 |
| 5a | 2.07 | 7 | 12.8 | 75 |
| 5b | do. | 9–12 | do. | 93 |
| 6 | 2.1 | 9–12 | 22.6 | 170 |
| 7 | 2.3 | 9–12 | 14.5 | 107 |

Example 3

A number of substantially non-solvated crystalline aluminum hydride products were prepared following the procedure described in Example 1 except that no magnesium was incorporated into the lattice.

Samples were stored in sealed glass vials under a nitrogen atmosphere at either ambient temperature (~ 20°–25° C.) or about minus 15° C. Visual examination of the samples after the prolonged storage indicated that those stored at ambient temperature were a light gray color indicating a small amount of decomposition during storage. All of the samples stored at about minus 15° C. were still white.

The per cent decomposition was determined from carbon and hydrogen analysis of the samples. The results of this study are presented in Table II.

| Sample No. | Storage Period (years) | Per Cent Decomposition | |
|---|---|---|---|
| | | Ambient Temp. | −15° C. |
| 1 | 1.8 | 0.8 | None |
| 2 | 1.8 | 0.4 | None |
| 3 | 1.7 | 0.9 | None |
| 4 | 1.6 | 1.1 | None |
| 5 | 1.4 | 0.7 | None |
| 6 | 1.4 | 1.0 | None |
| 7 | 1.3 | 1.0 | None |

A sample of the same aluminum hydride which had been stored at ambient temperature and at the low temperature were tested in a Taliani apparatus at 60° C. under a nitrogen atmosphere.

The samples stored at the low temperature showed some increase in thermal stability after the storage period although the improvement was not as pronounced as with the magnesium containing aluminum hydride. The results of these studies are summarized in Table III.

Table III

| Run No. | Storage Conditions | Orig. Sample | Days to Reach 1 Per Cent Decomposition Storage Time, Months | | | |
|---|---|---|---|---|---|---|
| | | | 8 | 11 | 16 | 20 |
| 1a | Ambient Temp. | 5.3 | 11.2 | 8.5 | 9.0 | 7.0 |
| 1b | −15° C. | do. | 10.5 | 11.6 | 13.9 | 12.6 |

In a manner similar to the foregoing Examples, the thermal stability of substantially non-solvated crystalline aluminum hydride and particularly such hydrides having at least about 0.01 weight percent and usually from about 0.1 to about 3 weight percent magnesium incorporated into the crystal lattice thereof can be unexpectedly markedly increased by storing the materials under a substantially inert atmosphere at a maximum temperature of about 0° C. and at temperatures as low as about minus 200° C. or lower for a period of at least about 4 months.

Various modifications can be made in the present invention without departing from the spirit or scope thereof for it is understood that I limit myself only as defined in the appended claims.

I claim:

1. A process for increasing the thermostability of a crystalline, substantially non-ether solvated aluminum hydride which comprises placing a crystalline, substantially non-ether solvated aluminum hydride in a substantially inert atmosphere and maintaining said aluminum hydride in the presence of said atmosphere at a maximum temperature of about 0° C. for a period of at least about 4 months.

2. The process as defined in claim 1 wherein the aluminum hydride is placed in contact with an atmosphere selected from the group consisting of nitrogen, argon, hydrogen or helium and maintained in contact with said atmosphere at a maximum temperature of about minus 10° C.

3. The process as defined in claim 2 wherein the aluminum hydride is maintained in contact with said atmosphere at a temperature of from about minus 15° to about minus 200° C. for a period of at least about 6 months.

4. The process as defined in claim 1 wherein the aluminum hydride is a crystalline, substantially non-ether solvated aluminum hydride having at least about 0.01 weight percent magnesium incorporated into the crystal lattice thereof.

5. The process as defined in claim 1 wherein the aluminum hydride is a hexagonal crystalline, substantially non-ether solvated aluminum hydride having from about 0.1 to about 3 weight percent magnesium incorporated into the crystal lattice thereof.

* * * * *